United States Patent Office 3,504,604
Patented Apr. 7, 1970

3,504,604
CAMERA MECHANISM FOR DETECTION OF BRIGHTNESS AND CONTROL OF EXPOSURE
Kiyoshi Kitai, Tokyo, Japan, assignor to Kabushiki Kaisha Hattori Tokeiten, Tokyo, Japan
Filed Feb. 12, 1968, Ser. No. 704,709
Claims priority, application Japan, Feb. 14, 1967, 42/9,056
Int. Cl. G03b 7/08, 9/58
U.S. Cl. 95—10                  10 Claims

ABSTRACT OF THE DISCLOSURE

An electronic shutter mechanism has a member actuated by an electromagnet controlled by an electric circuit which prior to an exposure senses the brightness of a subject to determine whether the brightness is above or below a selected level and thereafter serves as a timing circuit to control the time of an exposure in accordance with the brightness of the subject.

This invention relates to a camera shutter operating and control mechanism having means for detecting the brightness of a subject to be photographed before starting an exposure and thereafter controlling the exposure time in accordance with the brightness of the subject.

Known camera shutter mechanisms have required an electric delay circuit for timing the exposure and changeover switches for adding other electric circuit elements to detect the brightness of the subject prior to the exposure. This has required rather complex mechanism and circuitry with the resulting disadvantage of decreasing its reliability and increasing the manufacturing costs.

In accordance with the present invention, a single electromagnet controlled by an electric circuit including a photoelectric element and a condenser is used both to detect the brightness of a subject prior to an exposure and thereafter to control the shutter to provide a proper exposure according to the brightness of the subject to be photographed. The invention materially simplifies the mechanism and circuitry so as to reduce the cost of manufacture and increase the reliability of the camera shutter mechanism.

Figure 1:
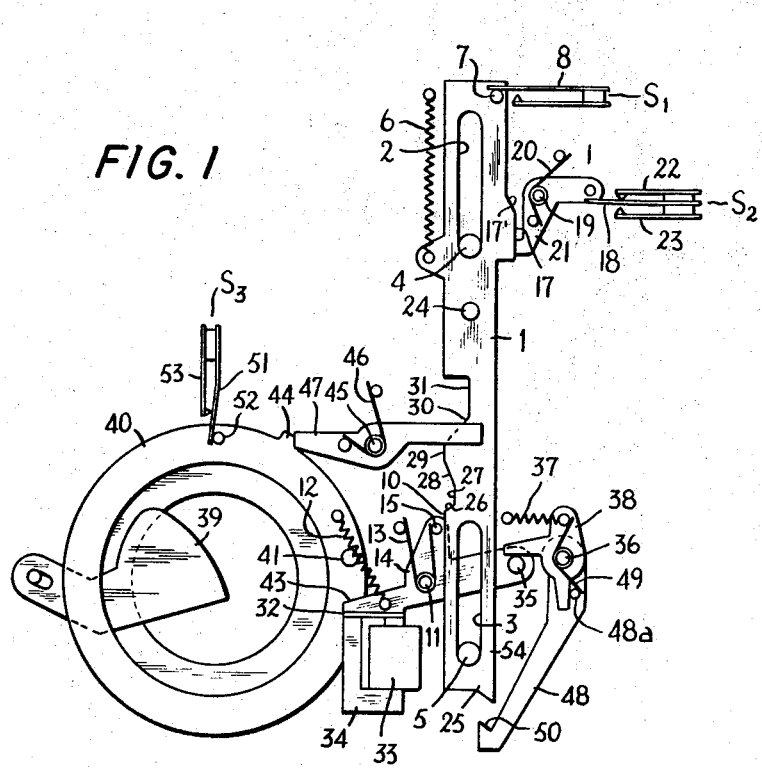
Figure 2:
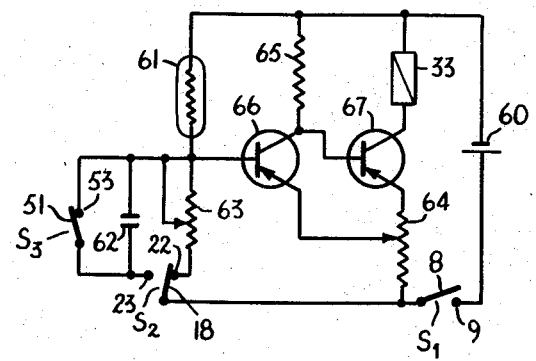

The nature and advantages of the invention will be more fully understood from the following description of a preferred embodiment shown by way of example in the accompanying drawings in which:

FIG. 1 is a schematic developed view of the principal portions of an automatic shutter mechanism in accordance with the invention, and FIG. 2 is a diagram of the electric circuit of the shutter mechanism shown in FIG. 1.

With reference to FIG. 1, the shutter mechanism is shown as comprising a release lever 1 which is guided for movement upwardly and downwardly by pins 4 and 5 which are mounted on a suitable support and are slidably received in guide grooves 2 and 3 of the release lever. A tension spring 6 having one end attached to the release lever 1 and the other end attached to a suitable support biases the release lever to its upper position as shown in FIG. 1. In this position, a pin 7 on the release lever engages a contact piece 8 of a power source switch S1 so as to disconnect it from the contact 9 and thereby hold the switch in open position. A side face 17 of the release lever 1 engages a switch lever 21 of a changeover switch S2 which is pivotally mounted on a shaft 19 and is biased to turn in a clockwise direction by a spring 20. A contact piece 18 of the changeover switch S2 is normally biased so as to engage a contact 22 and is engageable by a pin 21a on the switch lever 21 to disengage it from contact 22 and bring it into engagement with contact 23 when the release lever 1 is moved downwardly sufficiently that the switch lever 21 rides off a step 17' and is rotated in a clockwise direction by its spring 20. When the release lever 1 is in its upper position as shown in FIG. 1, the side face 17 holds the switch lever 21 in a counter-clockwise position and hence the contact piece 18 of the changeover switch S2 is in engagement with contact 22.

A contoured side face 10, 26, 27, 28, 29, 30 and 31 of the release lever 1 is engageable with a pin 15 of a closing lever 14 which is pivoted on a shaft 11 and is biased to turn in a clockwise direction by springs 12 and 13. When the release lever 1 is in its upper position, the closing lever 14 is held in open position by engagement of pin 15 with the side edge 10 of the release lever 1 as shown in FIG. 1. The closing lever 14 carries a magnetic armature 32 of an electromagnet 33 having an iron core 34. When the electromagnet is energized, the closing lever 14 is held in open position as illustrated in FIG. 1 by attraction of the armature 32 to the iron core 34. When the release lever 1 is moved downwardly, side faces 26, 27, 30 and 31 of the release lever permit the closing lever 14 to be turned in a clockwise direction by its springs 12 and 13 provided that the closing lever is not retained in open position by the electromagnet 33. An intermediate side edge portion 29 of the release lever 1 is engageable with pin 15 to position the closing lever in open position.

Shutter blades 39 (of which only one is shown) are operable by a ring 40 which is rotatable in a clockwise direction by the spring 12 to open the shutter blades and is rotatable in a counter-clockwise direction to close the shutter by engagement of a side face 43 of the closing lever 14 with a pin 41 on the ring when the closing lever rotates in a clockwise direction from the position shown in FIG 1. Prior to an exposure, the shutter operating ring 40 is held in closed position by engagement of a projection 44 on the ring with a detent member 47 which is pivotally mounted on a shaft 45 and biased to turn in a counter-clockwise direction by a spring 46. At a predetermined point in the downward movement of the release lever 1, the detent member 47 is engaged by a pin 24 on the release lever to disengage it from the projection 44 and thereby permit rotation of ring 40 in a clockwise direction by spring 12 to open the shutter. A pin 52 on the ring 40 presses a contact piece 51 of a timing switch S3 into engagement with a contact 53 to close the switch when the shutter is in closed position.

A locking lever 48 is pivotally mounted on a shaft 36 and is actuatable by a middle lever 38 which is coaxially pivoted on the same shaft 36 and is engageable with a pin 48a on the locking lever. A spring 49 acts on the pin 48a of the locking lever 48 to hold it normally in engagement with the middle lever 38. A spring 37 acts on the middle lever 38 to turn it and hence also the locking lever 48 in a counter-clockwise direction. When the closing lever 14 is in open position as illustrated in FIG. 1, a pin 35 on the closing lever engages the middle lever 38 to hold it in a position in which a hook portion 50 on the locking lever 48 is in the path of movement of an engaging portion 25 on the release lever 1 so as to block downward movement of the release lever. When the closing lever 14 is permitted to rotate in a clockwise direction, the middle lever 38 and locking lever 48 are rotated in a counter-clockwise direction by spring 37 so as to move the hook portion 50 out of the path of movement of the release lever 1.

The electric circuit cooperating with the mechanism of FIG. 1 is shown in FIG. 2 in which identical parts have been indicated by the same reference numerals as in FIG. 1. The circuit is shown as comprising a power source 60, a photoresistor 61, a timing condenser 62, variable resistances 63 and 64, a fixed resistance 65, transistors 66 and 67, the electromagnet coil 33, power source switch S1, changeover switch S2 and timing switch S3. The transistors 66 and 67 with associated components comprise a modified Schmidt multivibrator so that when one of the transistors is conductive, the other becomes nonconductive. The change-over from one transistor to the other occurs very rapidly. The electromagnet coil 33 is connected in the collector circuit of the transistor 67 so that the electromagnet is energized when transistor 67 is conducting. The positions of the switches shown in FIG. 2 correspond to the condition of the mechanism as illustrated in FIG. 1.

When the release lever 1 has been moved down a slight amount from the position shown in FIG. 1 so as to close the power switch S1 while the other switches remain in the positions shown in FIG. 1 and FIG. 2, the timing condenser 62 is disconnected by changeover switch S2 and the circuit functions as a circuit for detecting the brightness of a subject to be photographed. Whether the transistor 66 is conducting or nonconducting is determined by the base voltage and the emitter voltage of the transistor as determined by the setting of variable resistance 64 and the ratio of the resistance of the photoresistive element 61 with that of the variable resistance 63 which has been set at a selected value. If the values are such that transistor 66 conducts, the transistor 67 will be nonconducting and hence the electromagnet coil 33 will not be energized.

When the release lever 1 moves further so that the switch lever 21 rides off the step 17' and the contact piece 18 of the changeover switch S2 is thereby connected to contact 23, the variable resistance 63 is disconnected and the condenser 62 is connected in circuit with the photoresistor 61 so as to form a delay circuit. As the timing switch S3 is still closed, so as to short circuit the condenser 62, the transistor 66 is reverse biased and the transistor 67 is forward biased so that a current will flow in the electromagnet coil 33. When the timing switch S3 opens, as occurs when the projection 44 on ring 40 is released by the detent 47 to start an exposure, the condenser 62 begins to charge. After a period of time determined by the capacity of the condenser 62 and the resistance of the photoresistor 61 according to the brightness of the subject, the transistor 66 is forward biased so as to become conductive while the transistor 67 is reverse biased and becomes non-conductive so that the electromagnet coil 33 is deenergized.

OPERATION

In operation, the release lever 1 is moved progressively downwardly from the position shown in FIG. 1. In a first increment of movement, the pin 7 on the release lever 1 permits the contact piece 8 of the power source switch S1 to move downwardly into engagement with the contact 9 so as to close the switch and thereby supply power to the transistor circuit. In a first stage of operation before any exposure is started, the electric circuit operates as a detecting circuit to sense the brightness of the subject to be photographed and determine whether an exposure can be taken with ambient light. The brightness of the subject is sensed by the photoresistor 61 the resulting resistance of which affects the bias on the transistor 66. If the brightness of the subject is greater than a predetermined value, the transistor 66 is forward biased so as to be conducting whereupon transistor 67 is nonconducting so that no current will flow in the electromagnet coil 33. When the brightness of the subject is less than the selected value, the transistor 66 is reverse biased so as to be nonconducting whereupon transistor 67 is conducting and supplies current to the electromagnet.

As the release lever 1 continues to move downwardly, the pin 15 on the closing lever 14 comes to the step 26 in the side face of the release lever so as to permit clockwise rotation of the closing lever by springs 12 and 13. However, if the electromagnet 33 is energized, its attraction of the armature 32 holes the closing lever against rotation. Hence, if the brightness of subject is less than the selected value, current is supplied to the electromagnet coil 33 so that the closing lever 14, middle lever 38 and locking lever 48 remain in the positions shown in FIG. 1. The hook portion 50 of the locking lever is thereby positioned in the path of the engaging portion 25 of the release lever 1 to block downward movement of the release lever and thereby indicate that the brightness of the subject is below the selected value. If, on the other hand, the brightness of the subject is greater than the selected value, the electromagnet 33 is deenergized and the closing lever 14 is turned about its pivot in a clockwise direction by spirngs 12 and 13 and permits the middle lever 38 to be turned in a counterclockwise directon by its spring 37 so as to swing the locking lever 48 into a position in which the hook portion 50 is out of the path of movement of the engaging portion 25 of the release lever 1 so that downward movement of the release lever can continue.

As the release lever 1 continues to move downwardly, the switch lever 21 of changeover switch S2 rides off of the side face 17 and down a step 17' so as to disconnect the contact piece 18 from contact 22 and connect it with contact 23. There is thus provided a time delay circuit comprising the condenser 62 and photoresistor 61.

As the release lever 1 moves downwardly, the pin 15 on the closing lever 14 is engaged by side face 29 so as to position the closing lever 14 in open position regardless of whether or not the electromagnet 33 is energized. Upon further downward movement of the release lever 1, recessed portions 30 and 31 of the side face permit clockwise pivotal movement of the closing lever 14. However, since the timing switch S3 is closed and short circuits the condenser 62, the transistor 66 is reverse biased so as to be nonconducting and the transistor 67 is forward biased so as to be conducting and supply current to the electromagnet coil 33. The closing lever 14 is thereby retained in its open position by the electromagnet. Upon further downward movement of the release lever 1, the pin 24 engages the detent member 47 so as to pivot it in a clockwise direction and thereby release it from the projection 44 of the shutter operating ring 40. The ring 40 is thereupon rotated in a clockwise direction by the spring 12 to open the shutter and thereby begin an exposure. Upon rotation of the ring 40 to the right, the pin 52 permits the timing switch S3 to open. The condenser 62 is hence no longer shorted and proceeds to charge through the photoresistor at a rate depending on the brightness of the subject. When the terminal voltage of the condenser 62 reaches a sufficient voltage to provide a forward bias for the transistor 66, that transistor becomes conductive and transistor 67 is cut off so as to deenergize the electromagnet 33 and thereby permit rotation of the closing lever 14 in a clockwise direction. The side face 43 of the closing lever 14 engages pin 41 on the ring 40 to rotate the ring in a counter-clockwise direction and thereby close to the shutter to terminate the exposure. The exposure having been completed, the release lever 1 is permitted to move upwardly under tension of the spring 6 whereupon the mechanism returns to the initial state shown in FIG. 1.

In the foregoing embodiment, the closing lever 14 is retained in a tensioned position when the electromagnet is energized but this arrangement can if desired be reversed so that the closing lever 14 is retained in a tensioned position by an engaging menber and is actuated by the engaging member when the electromagnet is energized. It is also possible to use the locking lever 48 as a means for indicating the brightness of the subject as detected by the electric circuit. Furthermore, it is possible to change the direction of action of the spring 6 so as to act downwardly on the release lever 1 which is then moved to an upper limit position by a winding operation of the camera and retained by a suitable detent or engaging member. Upon release of the engaging member, the release lever 1 is moved downwardly by its spring with suitable speed control to operate the shutter mechanism as described. This arrangement makes it possible to decrease the stroke required for release of the camera shutter mechanism.

In accordance with the invention, the delay circuit for automatically controlling an exposure is converted to a circuit for detecting the brightness of a subject before starting the exposure merely by adding the variable resistance 63 and the changeover switch S2. The same electromagnet is used both for exposure control and for detection of brightness prior to the exposure with the result that highest reliability is obtained without decreasing accuracy. Moreover, the lesser number of parts and components decreases the cost of manufacture of the shutter operating mechanism.

What I claim and desire to secure by Letters Patent is:

1. In combination with a camera shutter, operating and control means comprising an electromagnet, actuating means controlled by said electromagnet to indicate brightness and to control the operation of the shutter, and electric circuit means controlling the activation of said electromagnet, said circuit means including a photosensitive element for sensing the brightness of a subject and activating said electromagnet before the start of an exposure to control said actuating means to indicate whether the brightness is above a selected value, and thereafter controlling the activation of said electromagnet during an exposure to control said actuating means to provide proper exposure according to the brightness of the subject being photographed.

2. A combination according to claim 1, in which said operating and control means comprises a release member movable to control the operation of said shutter, and in which said actuating means controlled by said electromagnet includes means for blocking movement of said release member to prevent operation of the shutter when the brightness of the subject is below said selected value.

3. A combination according to claim 1, in which said electric circuit further includes two current control means connected as a multivibrator so that when one of said current control means is conducting the other is nonconducting, one of said current control means controlling the supply of current to said electromagnet, a condenser and switching means for connecting said photosensitive elements with one of said current control means prior to starting an exposure to control the conduction of said current control means in accordance with the brightness of the subject, and for thereafter connecting said photosensitive element with said condenser to provide a time delay circuit for timing the exposure in accordance with the brightness of the subject.

4. In combination with a camera shutter, operating and control means comprising a release member movable to control the cycle of operation of said means, an electromagnet, a shutter operating member controlled jointly by said release member and said electromagnet and an electric circuit controlling said electromagnet and including means for sensing the brightness of a subject to be photographed, a condenser, means for controlling the supply of current to said electromagnet and switch means for connecting said sensing means with said current controlling means before the start of an exposure to control the supply of current to said electromagnet and thus control said shutter closing means in accordance with the brightness of the subject, and for thereafter connecting said sensing means with condenser to form a timing circuit connected with said current controlling means to controll the supply of current to said electromagnet and thus control the shutter operating member to provide an exposure timed in accordance with the brightness of the subject.

5. A combination according to claim 4, in which said operating and control means includes a locking member actuated by said shutter operating member to block movement of said release member when the brightness of the subject is below a selected value.

6. A combination according to claim 5, in which said locking member comprises a pivoted member having a portion engageable with said release member, and in which a middle lever operatively connects said locking member with said shutter operating member.

7. A combination according to claim 4, in which said switch means comprises a changeover switch actuated by said release member.

8. A combination according to claim 4, in which said current controlling means comprises two transistors connected as a multivibrator so that when one transistor is conducting the other is nonconducting.

9. A combination according to claim 4, in which said shutter operating member comprises a pivotally mounted member which is biased to turn in one direction and is conditionally held against said bias by said release member when in predetermined position and by said electromagnet when energized.

10. A combination according to claim 9, in which said shutter operating member is biased to turn in a direction to indicate that the brightness of the subject is above a selected value prior to starting an exposure and to close the shutter at a selected time to terminate an exposure.

References Cited

UNITED STATES PATENTS

| 3,257,919 | 6/1966 | Sato et al. |
| 3,348,460 | 10/1967 | Schmitt. |
| 3,368,469 | 2/1968 | Rentschler. |
| 3,407,716 | 10/1968 | Wick et al. |
| 3,416,421 | 12/1968 | Biedermann et al. |

NORTON ANSHER, Primary Examiner

J. F. PETERS, Jr., Assistant Examiner

U.S. Cl. X.R.

95—53